US007692887B2

(12) United States Patent  
Dolan, Jr. et al.

(10) Patent No.: US 7,692,887 B2  
(45) Date of Patent: Apr. 6, 2010

(54) METHOD AND APPARATUS FOR MEASURING RESISTANCE OF A RESISTIVE SENSOR

(75) Inventors: Daniel J. Dolan, Jr., Cottage Grove, MN (US); Hao Fang, Eden Prairie, MN (US); Jeffrey A. Gleason, Burnsville, MN (US); Ross S. Wilson, Menlo Park, CA (US)

(73) Assignee: Agere Systems Inc., Allentown, PA (US)

( * ) Notice: Subject to any disclaimer, the term of this patent is extended or adjusted under 35 U.S.C. 154(b) by 795 days.

(21) Appl. No.: 11/520,493

(22) Filed: Sep. 13, 2006

(65) Prior Publication Data

US 2008/0062551 A1 Mar. 13, 2008

(51) Int. Cl.  
*G11B 27/36* (2006.01)

(52) U.S. Cl. .............................. 360/31; 360/51; 360/75; 360/313

(58) Field of Classification Search ........................ None  
See application file for complete search history.

(56) References Cited

U.S. PATENT DOCUMENTS

| 4,746,869 | A |   | 5/1988  | Schrag et al. ............... 324/546 |
|-----------|---|---|---------|--------------------------------------|
| 4,862,078 | A |   | 8/1989  | Kawabata .................... 324/212 |
| 5,087,884 | A |   | 2/1992  | Brannon ...................... 324/523 |
| 5,301,080 | A | * | 4/1994  | Ottesen et al. ................ 360/66 |
| 5,589,777 | A |   | 12/1996 | Davis et al. .................. 324/537 |
| 5,696,445 | A |   | 12/1997 | Inbar .......................... 324/228 |
| 5,719,719 | A | * | 2/1998  | Tsuyoshi et al. .............. 360/66 |
| 5,790,334 | A | * | 8/1998  | Cunningham ................ 360/66 |
| 6,067,200 | A | * | 5/2000  | Ohba et al. ................... 360/66 |
| 6,069,761 | A |   | 5/2000  | Stupp .......................... 360/66 |
| 6,225,802 | B1|   | 5/2001  | Ramalho et al. ............. 324/252 |
| 6,320,713 | B1| * | 11/2001 | Tretter et al. ................. 360/66 |
| 6,349,007 | B1|   | 2/2002  | Jiang .......................... 360/31 |
| 6,476,602 | B1| * | 11/2002 | Gray ........................... 324/210 |
| 6,487,034 | B1|   | 11/2002 | Jiang et al. ................... 360/68 |
| 6,687,064 | B1|   | 2/2004  | Jiang et al. ................... 360/31 |
| 6,731,448 | B2| * | 5/2004  | Briskin et al. ................ 360/66 |
| 6,744,578 | B1| * | 6/2004  | Bishop ........................ 360/31 |
| 6,751,034 | B1| * | 6/2004  | Bloodworth et al. ......... 360/46 |
| 6,794,880 | B2|   | 9/2004  | Tucker ........................ 324/511 |
| 6,822,815 | B2| * | 11/2004 | Lim et al. ..................... 360/31 |
| 6,859,678 | B1| * | 2/2005  | Barada et al. ................ 700/121 |
| 6,947,238 | B2| * | 9/2005  | Takayoshi et al. ............ 360/66 |
| 7,130,143 | B1| * | 10/2006 | Tretter ......................... 360/66 |
| 7,339,760 | B2| * | 3/2008  | Gleason et al. ............... 360/67 |
| 2005/0046983 | A1 |  | 3/2005 | Fong et al. .................... 360/31 |

* cited by examiner

*Primary Examiner*—Dismery E Mercedes  
(74) *Attorney, Agent, or Firm*—Mendelsohn, Drucker & Associates, P.C.; Craig M. Brown; Steve Mendelsohn (57) ABSTRACT

An apparatus and method for determining a head parameter value (e.g., head resistance) of a resistive head. A test head current is supplied to the head during a head parameter measurement interval using the same current sources that supply a bias current to the head during an operating (read operation) interval. The determined head parameter value is latched for use in setting the control loop gain for a control loop that controls the current sources during the operating interval.

40 Claims, 6 Drawing Sheets

METHOD AND APPARATUS FOR MEASURING RESISTANCE OF A RESISTIVE SENSOR

FIELD OF THE INVENTION

The present invention relates to disc drives and other mass storage media employing a magnetic head to read data from and write data to the media, and more particularly to a method and apparatus for measuring a head resistance.

BACKGROUND OF THE INVENTION

Figure 5:
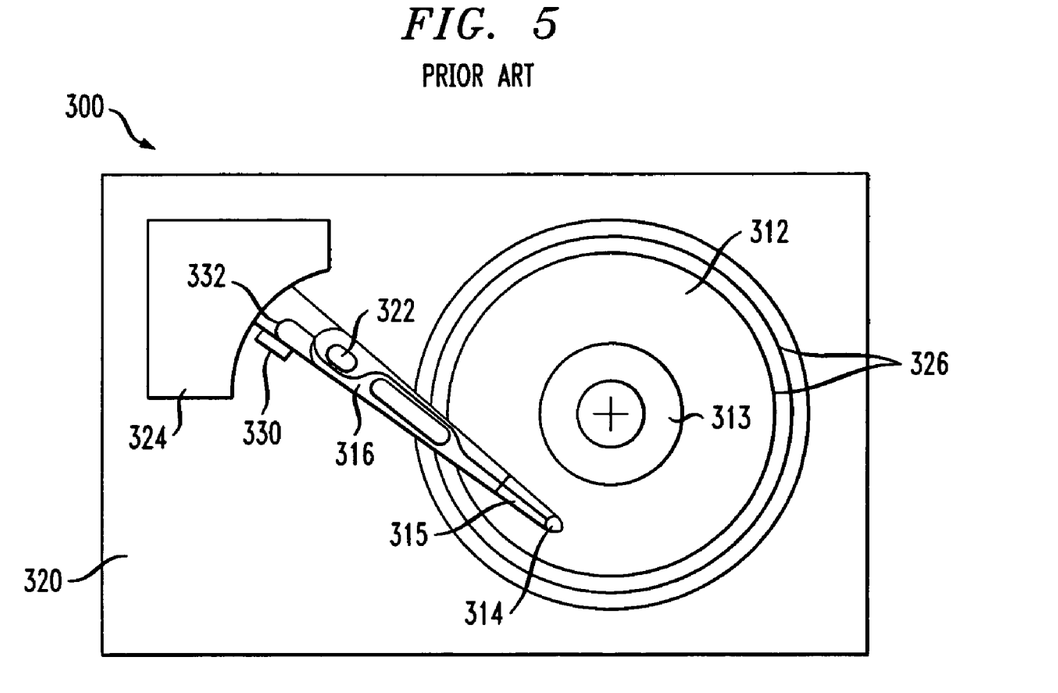
FIG. 5 illustrates components of a prior art disk drive system

A disc drive storage system 300 of FIG. 5 stores data for use by computer systems and electronic products that require internal data storage. The system 300 comprises a disc 312 on which is deposited magnetic material for storing information in the form of magnetized domains having a magnetized state representing either a binary one or a binary zero. The information is written to the disc 312 by magnetizing the domains during a write operation. The domains retain the magnetization for later retrieval during a read operation. The magnetized state is determined and the stored information derived therefrom for use by the computer system or electronic product.

The disk drive 300 comprises a magnetic recording medium in the form of the disk or platter 312 having a hub 313 and a magnetic read/write transducer 314, commonly referred to as a read/write head, for reading data stored on the disk 312 and writing (storing) data to the disk 312. The read/write head 314 is attached to or formed integrally with a suspension arm 315 suspended over the disk 312 and affixed to a rotary actuator arm 316. The actuator arm 316 is pivotably connected to a platform 320 at a pivot joint 322. A voice coil motor 324 drives the actuator arm 316 to position the head 314 over a selected location on the disk 312. A surface of the disk 312 is divided into a plurality of concentric tracks 326, each track comprising user data fields (including error correction coding bytes), servo tracking fields and timing/synchronization fields.

Although only a single disk 312 is illustrated in FIG. 5, a conventional disk drive system comprises a plurality of double-sided disks oriented in a stacked configuration, with one head servicing one side of each disk.

Figure 6:
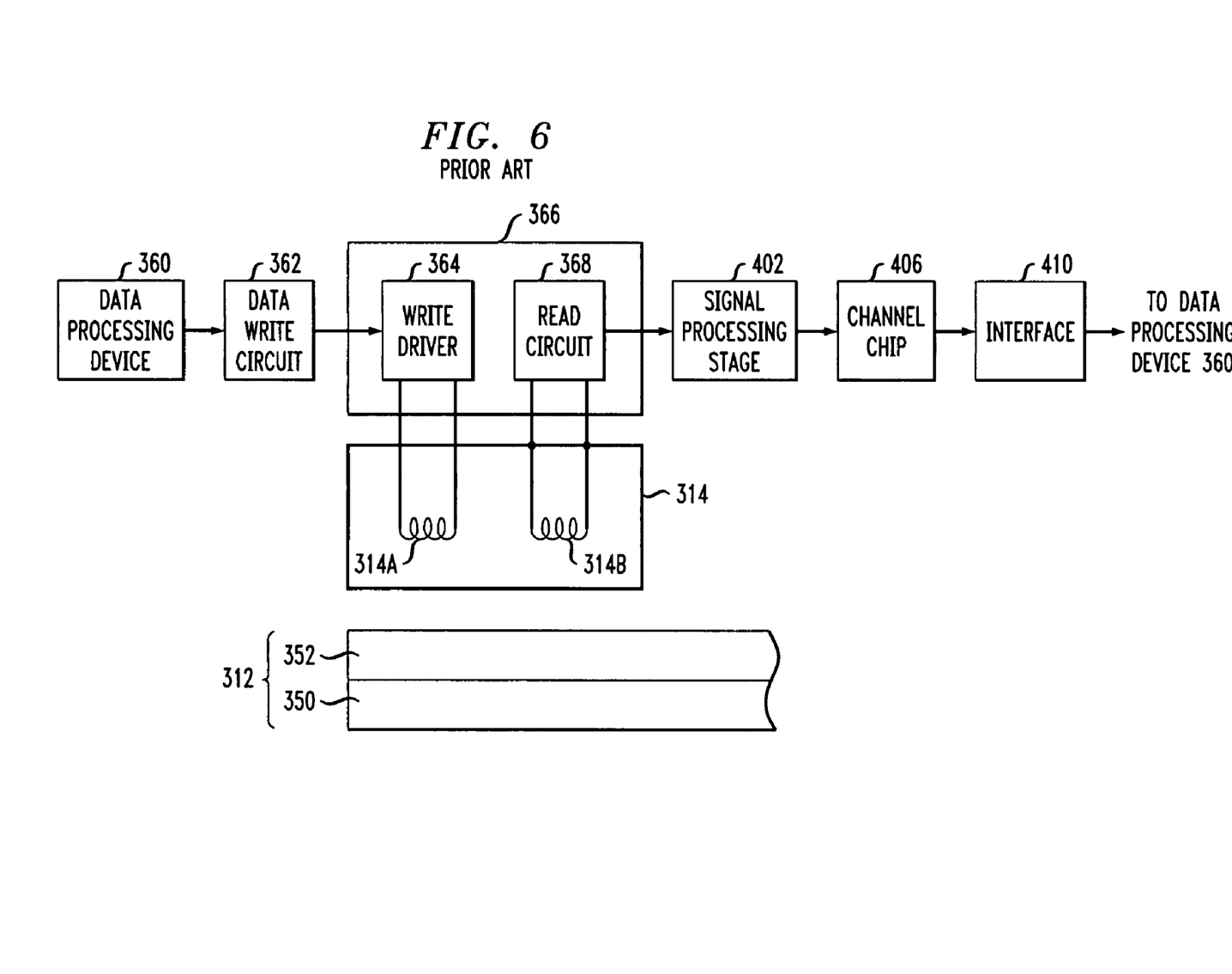
FIG. 6 is a block diagram illustrating certain components associated with read and write operations for the disk drive of FIG. 5.

In other data storage systems the head 314 operates with different types of storage media (not shown in the Figures) comprising, for example, a rigid magnetic disk, a flexible magnetic disk, magnetic tape and a magneto-optical disk As shown in a partial cross-sectional and partial block diagram of FIG. 6, the disk 312 comprises a substrate 350 and a thin film 352 disposed thereover. The head 314 comprises a write head 314A and a read head 314B.

Data bits to be written to the disk 312 are supplied by a data processing device 360 (e.g. a computer or music player) to a data write circuit 362 where the data bits are formatted and error detection/correction information appended thereto.

To write data bits to the disk 312, the voice coil motor 318 moves the suspension arm 316 to a desired radial position above the surface of the disk 312 while the spindle motor rotates the disk 312 to move a circumferential track region to be written under the write head 314A. A write driver 364 responsive to the data write circuit 362, scales up the relatively low voltages representing the data bits to a voltage range between about +/−6V and +/−10V and supplies a write current (typically between about 10 mA and 70 mA) to the inductive write head 314A. The write driver 364 also shapes the write current signal waveform to optimize the data writing process. The write driver 364 is conventionally an element of a preamplifier 366, and in one embodiment the preamplifier 366 comprises an element of an electronics module 330 (see FIG. 5) connected to the head 314 via conductors 332.

Write current supplied by the write driver 364 to the write head 314A (magnetically coupled to a magnetically permeable core not shown) creates a magnetic field that extends from the core across an air gap between the write head 314A and the disk 312. The magnetic field alters ferromagnetic domains in the thin film 352 to store the data bits as magnetic transitions.

The direction of the magnetic field generated by the write head 314A, and thus the direction of the altered ferromagnetic domains, is responsive to the direction of current flow through the write head 314A. Write current supplied in a first direction through the write head 314A causes the domains to align in a first direction (representing a date bit 0 for example) and write current supplied in a second direction (representing a data bit 1 for example) causes the domains to align in a second direction.

In the read mode the magnetic field of the ferromagnetic domains is detected to determine the stored data bit. The read head 314B (comprising a magneto-resistive (MR) sensor) senses the magnetic field transitions in the thin film 352 to detect the stored data bits. State-of-the-art MR read heads include giant magnetoresistive (GMR) heads and tunneling magnetoresistive (TMR) heads.

To read the data bits, the suspension arm 316 moves the head 314 while the disk 312 rotates to position the read head 314B above a magnetized region to be read. A read circuit 368 of the preamplifier 366 supplies a DC (direct current) bias voltage of between about 0.025V and about 0.2V across the read head 314B. Alternatively, the read circuit 368 can provide a controlled bias current ranging typically from about 50 uA to 5 mA to the head 314B. The bias circuits regulate voltage or current head bias only at low frequencies, and present a high impedance to the head 314B at mid- and high-frequencies, thus permitting mid- and high-frequency read data to be sensed across the head.

The magnetic field of the ferromagnetic domains in the thin film 352 passing under the read head 314B alters a resistance of the magneto-resistive material, imposing a differential AC (alternating current) component on the DC bias voltage. This bias voltage (or current) ensures that the head 314B operates in a linear response region, i.e., the resistance varies linearly responsive to the sensed magnetic field. The AC component representing the read data bits has a relatively small magnitude (e.g., a millivolt) with respect to the DC bias voltage.

The differential signal from the read head 314B is amplified in the read circuit 368. To reduce noise effects in subsequent signal processing stages, it is desired to maximize the amplification (gain) of the read circuit 368 consistent with signal linearity requirements and available power. Thus a first stage of the read circuit 368 typically comprises a low noise amplifier. The amplified signal is input to a signal processing stage 402 to further amplify the differential signal. The scaled-up signal is supplied to a channel chip 406 where data-detection (preferably using partial-response maximum-likelihood, or iterative decoding, techniques), error detection and correction processes are performed to detect the data bits from the voltage generated by the head 314B. The read data bits are returned to the processing device 360 via a user interface 410 (e.g., SATA, SCSI, SAS, PCMCIA interfaces).

Disk drive manufacturers and manufacturers of systems employing disk drives have an interest in knowing a read head resistance Rmr, i.e., the resistance of the MR sensor. Generally, the head resistance ranges from about 20-600Ω. Manufacturing tolerances among heads of the same material and construction can vary substantially, by several percent decades. The head resistance can also be affected by aging, heat and long-term electromigration in the head material. An optimum read head bias is related to the head resistance, and thus knowing the head resistance permits the disk drive manufacturer to employ the optimum bias.

To switch the head operation from writing to reading, the writer circuits are deactivated and ideally the read head is immediately ready to read the disk. However, the servo control loops in the read circuit 368 that supply the bias require a finite time to reach a steady-state condition. In particular, the components supplying the bias must be permitted sufficient time to ramp up from a zero DC bias to a desired steady state bias (referred to as a loop settling response time), without significant overshoot. State-of-the-art MR bias-control loops respond in about 50 ns. In certain applications for the disk drive system, it is required to bias the read head to within about 3% of its bias tolerance with a 50 ns settling time. As is known, the loop response characteristics are a sensitive function of loop bandwidth and gain, and the loop gain is in turn a function of the head resistance. It may therefore be difficult to stabilize the transient loop characteristics to avoid overshoot and undershoot over the entire expected head resistance range of 20-600 ohms within the desired settling time. If the value of Rmr is known, an optimal loop gain can be established irrespective of changes in Rmr and the loop settling time thereby minimized.

Non-optimal loop settling time may also require the manufacturer to allocate valuable track data storage space to dead zones, thus reducing storage capacity. For example, read only servo bursts for use in head control, are interspersed with readable/writable data records on the disk. When a write operation is complete a transition must be made to the read mode to read the disk servo bursts. If write-to-read recovery is long, the write operation must be terminated farther ahead of the servo data bits on the disk than would be necessary for a short write-to-read recovery time. The disk area covered by the head during the transition time cannot be used to store user data and is therefore referred to as a dead zone. The disk drive system designer always budgets for a worst-case or slow recovery when designing a disc format, and that format must include the dead zones.

In addition to minimizing loop settling time, proper utilization of the known Rmr can benefit other aspects of disk drive operation. For example, in certain implementations of the read circuit 368, head bias current or voltage is supplied through source- or emitter-followers through ballast resistors that are large relative to the head resistance and thus minimize loading across the head. Knowledge of the head resistance permits selection of optimum values for these ballast resistors, e.g., a value to minimize the head noise figure. Determining the head resistance can also identify a failed head, as resistance values exceeding a critical value $Rmr_{MAX}$ generally indicate a gross head failure.

As can be seen, knowledge of the Rmr value is advantageous for optimum operation of the read circuit and for optimal performance of the disk drive system. Once the head resistance is known, operational parameters of the read circuit can be established to optimize performance, including bias loop gain and bandwidth (which impact the bias loop transient response) and noise performance One approach to dealing with head resistance variation relies on designing the read circuit based on a nominal expected MR head value; however, manufacturing variations and a high sensitivity to resistance variations can lead to unacceptable performance variation when this approach is employed. Therefore, it is preferred to measure the resistance of each head in a disk drive system. Current read circuits (the read circuit 368 in FIG. 6) for use with an MR read head are designed to operate over one or more head resistance subranges within a total expected resistance range. An exemplary read circuit operates over one or more of the following selectable resistance subranges: 20-90 ohms, 50-250 ohms, and 100-400 ohms. Most read circuits are not capable of operating over the entire range of 20-400 ohms. The disk drive system manufacturer selects one of the ranges based on an expected head resistance and the reader circuits operate accordingly, even if the read head resistance is outside the selected range. Thus the selected read circuit range imposes strict tolerance requirements on the head resistance, and the coarseness of the selectable Rmr ranges precludes fine optimization of the settling response of the read circuit control loops. Certain disk drive manufacturers desire a uniform settling response over at least a two octave head resistance span, thus further aggravating settling time issues. Clearly, simply selecting an Rmr range for the read circuit does not provide optimum read circuit operation, especially if the head resistance Rmr changes with time.

Alternatively, to refine settling response time and other reader circuit parameters, the disk drive manufacturer can include within the read circuit of the preamplifier the necessary hardware components to measure the head resistance, when used in conjunction with special-purpose software operating elsewhere in the disk drive. Although existing preamplifiers may include the hardware features for making this measurement, there is some reluctance among disk drive manufacturers to measure Rmr dynamically using a software approach. The burdens of writing and certifying new microcode, the unavailability of existing data structures in which to store/recall the Rmr measurement results and modification of well-established production flow procedures to implement new code are cited as reasons for this reluctance.

To measure the head resistance it is also known, for example as disclosed in U.S. Pat. No. 6,225,802 to Ramalho et al. to sequentially and automatically supply different current values to the head until the head voltage equals a reference voltage. The resistance can then be determined from the known voltage and current. This technique consumes significant power when determining Rmr and consumes silicon area when implemented in the integrated circuit comprising the preamplifier, since it cannot make dual use of significant reader circuitry used in normal reader operation. The method is also time consuming in that the test current values are supplied sequentially, thereby protracting the time until the head is ready to read the disk. This method also does not preserve the common mode voltage on the head, which can lead to sensitivity to momentary head-disc contact or, in extreme cases, to electrical breakdown of the air-film bearing on which the head flies. Further, the results obtained are susceptible to corruption should a thermal asperity coincide with the measurement process. Ramalho discloses use of the measured MR resistance to optimize head signal-output level or to post a fault tag whenever measured resistance falls outside a predetermined range. He does not disclose the advantages to read circuit settle-time performance that can be obtained by use of the MR resistance measurement to specify the loop-gain of MR bias-control loops

BRIEF SUMMARY OF THE INVENTION

According to one embodiment, the present invention comprises a method for determining a parameter of a resistive sensor. The method comprises supplying a bias test signal to the sensor from a bias source controlled by a control loop during a parameter measurement interval, wherein the control loop controls the bias source for supplying a bias operating signal to the sensor during an operating interval; permitting the control loop to reach a steady state condition; measuring a sensor parameter responsive to the bias test signal; digitizing the sensor parameter; and storing a digitized representation of the parameter.

According to another embodiment, the invention comprises an apparatus for determining a parameter of a resistive sensor. The apparatus comprises a bias source for supplying a bias signal to the sensor during an operating interval and for supplying a test signal to the sensor during a parameter measurement interval; a bias control module for controlling the bias source; an encoder responsive to a sensor parameter responsive to the bias signal supplied to the sensor, for digitizing the sensor parameter, and a memory element for storing a digitized representation of the sensor parameter, wherein the sensor parameter is supplied to the bias control module for controlling the bias sources during the operating interval.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Reference characters denote like elements throughout the figures and text.

DETAILED DESCRIPTION OF THE INVENTION

Before describing in detail the particular method and apparatus related to determining a magnetoresistive head resistance, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The present invention provides the needed Rmr information to optimize performance of the read circuit 368 and eliminates the need for the disk drive manufacturer to use an approximate or common value for the head resistance. According to one embodiment, the Rmr value is determined automatically, rapidly and efficiently at the time of a head switch or when the disk drive awakes from a sleep (power-conserving) mode.

The invention uses existing preamplifier (read circuit) MR head bias elements to inject a relatively low-intensity short-duration test current into the MR head. The head voltage (Vmr) is determined and digitized in one step using a multi-comparator ladder network. Since the injected current is known, the head resistance Rmr can be determined from the head voltage Vmr. Head stress during the test is minimal due to use of a low test current with a short duration or pulse width. Advantageously, if the MR resistance test is conducted responsive to a head switch operation, the measurement does not significantly extend the time required to switch read heads. Control logic for implementing the Rmr measurement functionality is simple and combinatorial.

Head bias control feedback loops within the read circuit 368 control current sources that supply head bias during a data read interval. interval. These are the same control loops that are operative to bias the MR head during a read operation. According to the present invention, the loop gain is determined responsive to the measured Rmr to optimize operation of the head bias control feedback loops. The measured head resistance value is also used to select optimal (highest-valued) bias-injection ballast resistors within the read circuit 368. Thus operation of the read circuit 358 is optimized responsive to the measured head resistance.

Figure 1:
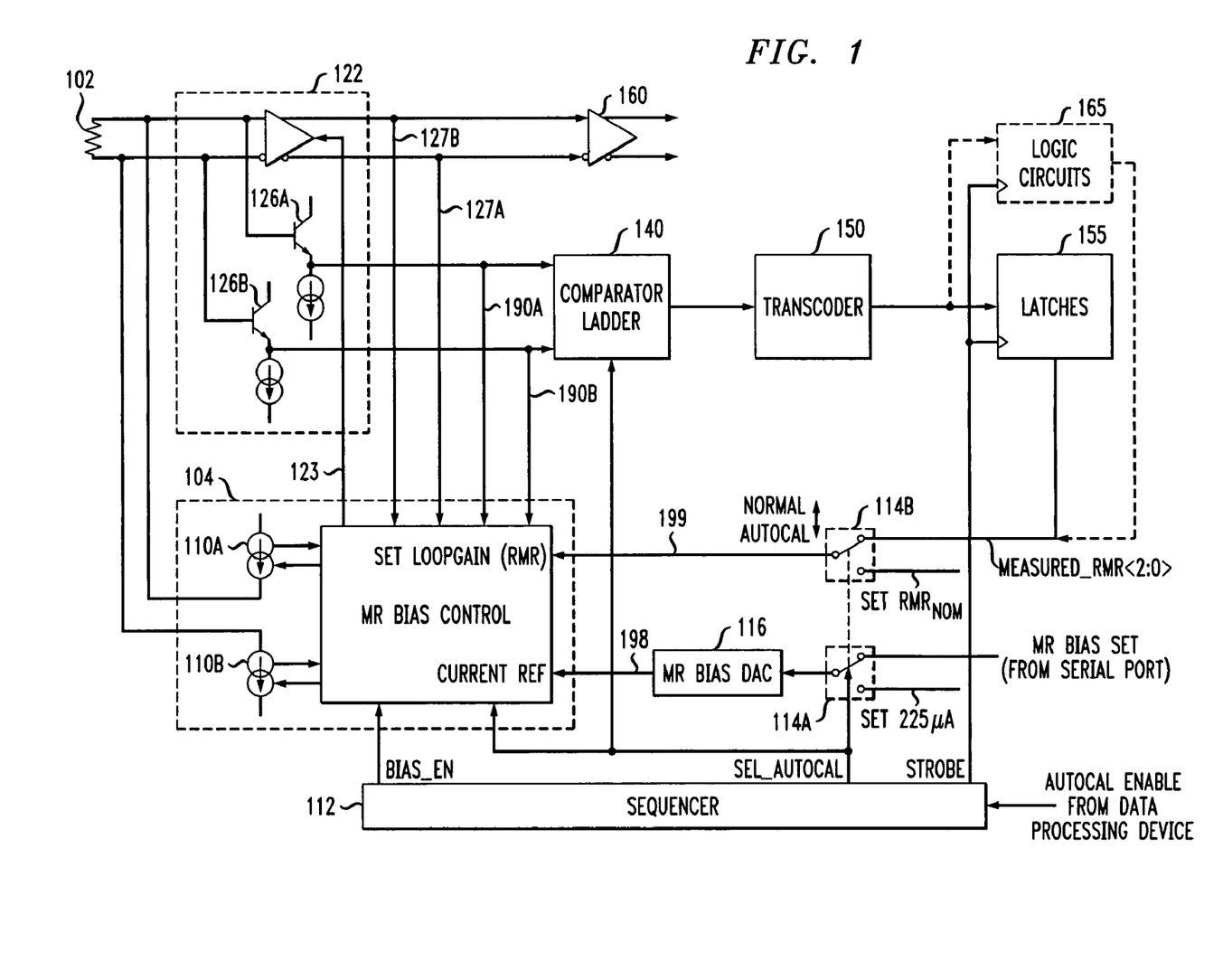
FIG. 1 is a partial schematic and partial block diagram of an apparatus for determining the read head resistance according to the teachings of the present invention.

FIG. 1 is a block diagram of certain elements of a disk drive preamplifier read circuit 368 that embody the concept of the present invention for measuring head resistance. Although FIG. 1 illustrates an MR head 102 configured for operation in a current-bias mode, extension to a voltage-bias mode entails modification of feedback paths within a MR bias control block 104, as is known by those skilled in the art, and has no effect on the Rmr measurement technique of the present invention. Thus the teachings of the present invention are also applicable to voltage-biased MR heads.

The MR bias control block 104 comprises the aforementioned feedback loops that regulate the MR head bias by varying the intensity of current supplied by current sources 110A and 110B; simultaneously null the output of a front-end low-noise preamplifier 122 over a conductor 123 in FIG. 1, while simultaneously maintaining zero common-mode voltage across the MR head 102. Head voltage sensed and buffered through emitter followers 126A and 126B, output signals of the amplifier 122 as supplied to the bias control block 104 via conductive paths 127A and 127B and current sensing lines 190A and 190B provide the sense information necessary to dose these feedback loops.

To assure rapid loop recovery when transitioning from a write to a read operation, during write operations it may be desired to maintain the feedback loops that regulate the current sources 110A and 110B (within the MR bias control block 104) at a setpoint near, but below, the read mode operating conditions. To accomplish this, commercial preamplifiers requiring aggressive write-to-read recovery times may implement a so-called dummy head that maintains loop closure when feedback paths through sources 110A and 110B are opened during a write operation. Preamplifiers not requiring such an aggressive recovery performance may not employ a dummy head.

During the MR resistance measurement sequence (also referred to as an autocal sequence) of the present invention, the current sources 110A and 110B of the MR bias control block 104 are configured to operate as a pair of complementary current sources with common mode voltage regulation due to feedback loop control of the current sources 110A and 110B. Since the autocal process employs normal current-bias mode operation, the common mode voltage regulation that is present during normal operation is also present during measurement of the head resistance.

In the autocal mode, the current sources 110A and 10B are configured identically to their configuration in the normal current-bias mode for the MR head 102. Thus according to the present invention no special current-source hardware is needed, with its attendant shortcomings of increased chip area and capacitive loading of the MR head 102.

In another embodiment, the current sources 110A and 110B are replaced with heavily ballasted emitter followers or degenerated current sources. Those skilled in the art understand that various circuit implementations can be substituted for the current sources 110A and 10B to supply the head current during both a normal head read operation and during the autocal sequence.

The autocal sequence proceeds as follows. Responsive to an autocal enable signal from the data processing device, a sequencer 112 generates a sel_autocal tag to nitiate the autocal process. The autocal enable signal can be generated when the data processing device awakes from a sleep or a hibernate mode (e.g., a power-conserving mode) or when the data processing device commands a head switch. Other system states can also trigger the autocal mode as desired, but the aforementioned states are preferred as during these operational modes the read circuit control loops are in a stable, low gain condition. Errors in the resistance measurement are therefore less likely.

The sel_autocal tag controls a switch element 114A to supply a digital code to an MR bias DAC 116 that in turn supplies a reference analog signal to the MR bias control block 104 such that a test measurement current of 225 µA is supplied to the MR head 102 from the current sources 110A and 110B. The current of 225 µA is used in one embodiment of the present invention, but other values may be chosen consistent with circuit offsets and other factors by supplying a different digital value to the MR bias DAC 116.

The DAC 116 is also operative during normal read mode operations to allow a disk drive manufacturer to set the MR read bias current. In the normal operation mode the switch section 114A supplies a digital set point bias value (as selected by the manufacturer and stored in a register of the preamplifier) to the MR bias DAC 116 where the digital value is converted to an analog value that is in turn supplied to the MR bias control block 104 for establishing the bias current supplied by the current sources 110A and 110B during read operations. Thus the sel_autocal tag momentarily switches the input of the DAC 116 to force a 225 µA (or a different value) bias current according to the position of the switch element 114A.

The sel_autocal tag also controls a switch element 114B to supply a nominal head resistance value ($Rmr_{NOM}$) to the MR bias control block 104 to cause the loop gain of the feedback control loops (that control the current sources 110A and 110B) to assume a nominal value sufficient to assure stability of the bias control loops (i.e., prevent loop oscillation) over the entire expected Rmr resistance range. It is therefore possible that for some values of Rmr a non-optimal (i.e., slow) response may occur. Thus the autocal interval must be sufficiently long to allow for the worst-case settling time of the feedback loops during the autocal process. In one embodiment the autocal interval is about 150 ns.

The sel_autocal tag also enables a DC operating bias in a comparator ladder circuit 120 and may optionally disable the low noise amplifier 122, with the exception of the two emitter followers 124A and 124B that buffer the head voltage from which the head resistance is determined. Switching the bias of the comparator ladder 120 assures that the auto_cal circuits do not continuously consume power during normal preamplifier operation.

The sequencer 112 also asserts a bias_en signal supplied to the MR bias control block 104 to activate the current sources 110A and 110B for supplying the predetermined autocal test current to the MR head 102 while simultaneously regulating the head common-mode voltage (CMV) to zero to ensure an accurate measurement result.

The MR voltage (Vmr) produced across the head 102 due to the test current is buffered by the pair of emitter followers 126A and 126B and supplied to a comparator ladder circuit 140 for converting the measured voltage to a thermometer code. In one embodiment, the comparator ladder comprises a six-level flash digitizer to convert the head voltage to a six bit thermometer code. This digitizer may use either linear or switched-capacitor auto-zero comparators and is preferably realized in fully differential form employing two tapped resistor ladders differentially driven at a top end by the signal produced the by followers 126A and 126B. The comparators are connected across the taps of the two ladders, in which counter-circulating currents flow to impart threshold offsets.

The thermometer code value is supplied to a transcoder 150 for conversion to a three-bit binary code. Latches 155 store the binary code representing the head voltage Vmr, which is the head resistance value scaled by the 225 µA head test current. The latches 155 in FIG. 1 are replaced by logic circuits 165 in other embodiments of the invention as described below.

After allowing a sufficient time for the head current to build-up to a steady-state value (about 150 ns in one embodiment), a strobe tag is asserted by the sequencer 112 to latch the outputs of the latches 155, where the latched value is the Rmr value scaled by the test current, that is, Rmr=Vmeasured/Itest, where Itest is the current supplied by the current sources 110A and 110B.

Latching the Rmr value (or a scaled representation of the Rmr value) is desired since after the autocal sequence, the head bias current is reset to the desired operating value (by operation of the switch element 114A). By retaining the measured head resistance in a latch or other memory element, the loop gains in the MR bias control block 104 can be held at the desired value (based on the measured Rmr) until the next autocal sequence, at which time a different Rmr value may be determined.

At the conclusion of the autocal mode a bias_en signal produced by the sequencer 112 reconfigures the circuits of the MR bias control block 104 for normal head reading operation.

Also, the switch 114 is controlled by the sequencer 112 to the normal state. The measured Rmr value (or a scaled representation of the Rmr value) is supplied by the latches 155 to the MR bias control block 104 (at a terminal labeled "set loop gain (Rmr) in FIG. 1) via the switch section 114B responsive to a strobe signal issued by the sequencer 112.

The switch section 114A supplies the set point bias (as stored in a register of the preamplifier of the disk drive system) to the MR bias DAC 116 where the bias is converted to an analog value that is supplied to the MR bias control block 104 for controlling the current sources 110A and 110B to the desired read mode current bias value.

Within the MR bias control block 104, the measured Rmr value or a scaled version thereof (supplied by the latches 155), the bias current set point value (supplied by the MR bias DAC 116) and the actual head voltage (as supplied from the low nose amplifier 122 via the conductors 127A and 127B) are used to determine the feedback loop parameters to control the current sources 110A and 110B to optimally bias the head 102. Optimal head transient and steady-state behavior is therefore achieved responsive to the actual Rmr value.

In one embodiment of the MR bias control block 104, the determined feedback loop parameters comprise the feedback loop gain that controls the current delivered by the current sources 110A and 110B. These control feedback loops are commonly implemented by OTAs (operational transconductance amplifiers) driving capacitors to achieve single dominant-pole characteristics. Closed-loop pole location is a function of the OTA gain. According to the present invention, the OTA gains (and thus the loop gain) is determined responsive to the measured Rmr to optimize performance of the head bias control feedback loops.

Figure 2:
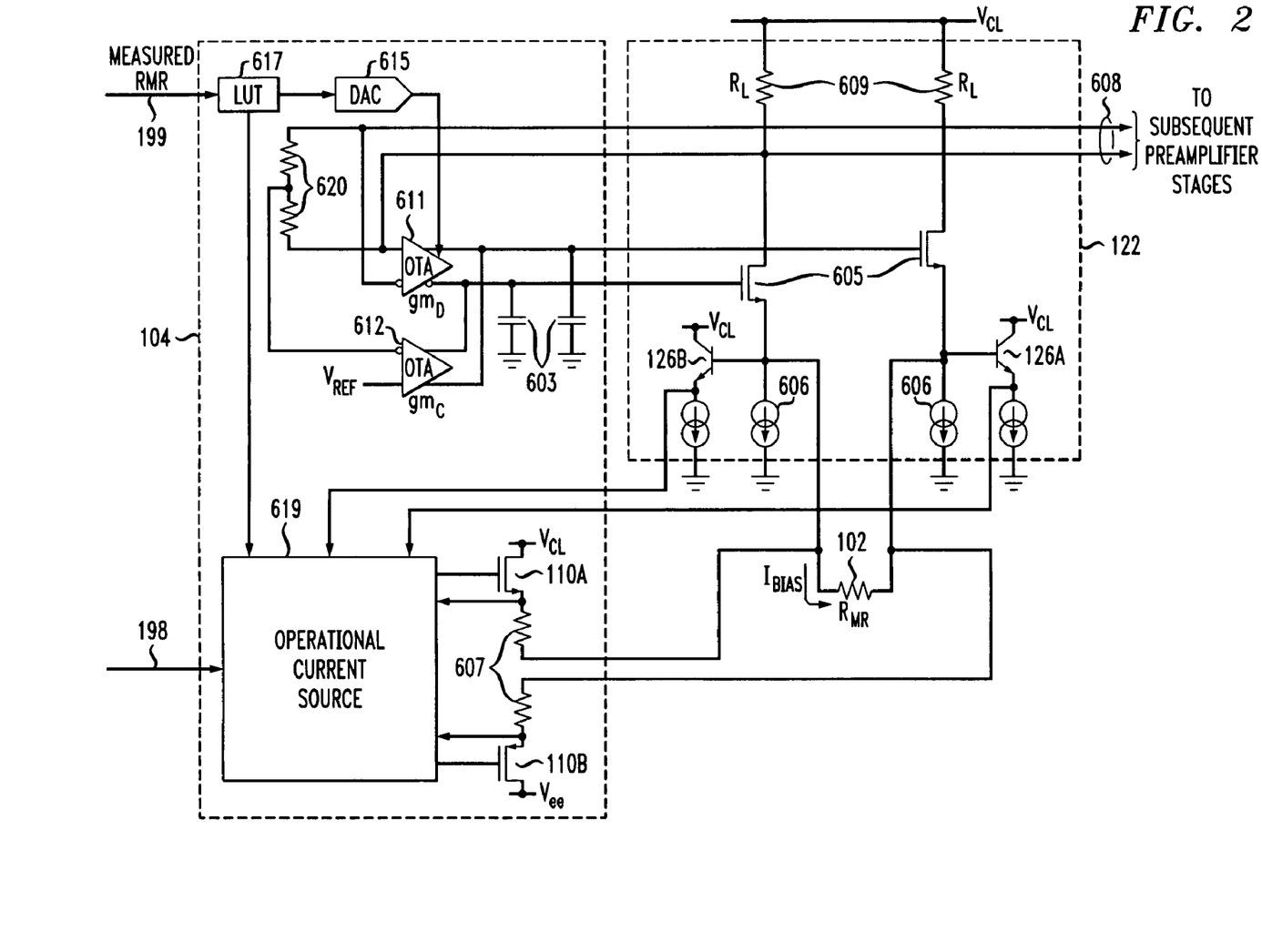
FIG. 2 is a partial schematic and partial block diagram of the MR bias control block and the preamplifier of FIG. 1.

FIG. 2 illustrates an exemplary method of controlling bias loop-gain and transient response using the measured head resistance. Numerous other implementations are known by those skilled in the art and consistent with the present invention. The reader low-noise preamplifier 122 further comprises an input stage comprising NMOSFET common-gate input transistors 605 each biased with a tail current mirror 606 and operative with a load resistor 609. The output signal from the input stage is delivered on differential conductors 608 to subsequent stages within the preamplifier 122. The MR head 102 is connected across source terminals of the NMOSFETS 605.

The MR bias control block 104 of FIG. 1 further comprises operating-point regulation feedback loops that include operational transconductance amplifiers (OTAS) 611 and 612. Compensating capacitors 613 provide loop integral compensation. A DAC 615 receives an input signal representing the measured Rmr value over a buss 199 (see also FIG. 1). A lookup table (LUT) 617 modifies the input signal as necessary prior to input to the DAC 615 and to an operational current source 619. Specifically, the LUT 617 selects a value of the ballast resistor 607 responsive to the measured head resistance and the commanded head bias current.

The DAC 615 establishes the tail current in the OTA 611 thus determining its transconductance $gm_D$, and hence the gain of the differential-mode feedback loop of which it is an element. These loops regulate the differential- and common-mode output signals of the input stage of the low noise preamplifier 122 to substantially zero, and Vref, respectively. An OTA 612 is part of a common-mode loop that regulates the common-mode voltage of the output signals on the differential conductors 608 to a potential Vref; a resistor divider 620 computes the common-mode point of the signals on the conductors 608. Analysis of input stage of the LNA 122 reveals that, to a first order, the loop gain of the differential operating point loop is $$A_V \cong \frac{gm_D}{sC_C} \cdot \frac{R_L}{r_S + R_{MR}/2};$$

hence, the selection of $gm_D \propto R_{MR}$ achieves an approximately constant $A_V$ if $r_s \ll R_{MR}/2$ as desired for uniform transient response over a wide range of $R_{MR}$. In the equation, $r_S$ denotes the source resistance of each of the common-gate LNA input transistors 605. An estimate of $r_s$ can be provided to the LUT 617 to improve the approximation.

The operational current source 619 (an element of the MR bias control element 104) receives an input representing the buffered MR head voltage from ballasted emitter/source followers 126A, 126B (see also FIG. 1) and uses this value and the voltage sensed at the sources followers 110A, 110B, to regulate the MR head bias current Ibias according to the value supplied on line 198 from the MR Bias DAC 116 of FIG. 1. Since the feedback loops within the operational current source 619 also exhibit dependency upon Rmr, an output from the LUT 617 is additionally delivered to the operational current source 619.

The measured head resistance value may also be used to select optimal (highest-valued, consistent with delivery of commanded MR bias current) bias-injection ballast resistors 607 within MR bias control block 104. In practice, selection capability may be implemented by providing parallel, suitably scaled, replicas of the followers 110A, 110B and ballast resistors 607; and choosing one of these replicas as a function of both head resistance as conveyed on the buss 199, and the commanded MR bias current. The lookup table (LUT) 617 of FIG. 2 participates in replica selection, in which case the LUT 617 may also receive digital information specifying the desired MR bias current because the highest admissible ballast resistance value is dependent also upon the commanded (user) bias current as supplied through the switch 114A of FIG. 1.

Thus by these various techniques, operation of the read circuit 368 (see FIG. 6) is optimized responsive to the measured head resistance.

As noted from the discussion of FIG. 6, the read circuit 368 is one element of the preamplifier 366. Certain commercially available preamplifiers 368 provide for both voltage bias mode and current bias mode. If the disk drive manufacturer elects to use voltage bias mode for the MR head, the Rmr measurement technique of the present invention is accomplished by momentarily commanding current bias mode for the duration of the measurement then reverting to voltage bias mode during head operation.

During normal head read operations (i.e., not the autocal mode) the voltage developed across the head 102 responsive to ferromagnetic domains in the disk, is supplied to the low noise amplifier 122 and subsequent gain stages 160, which comprise elements of the read circuits 368 of FIG. 6.

Typically, the Rmr measurement operation as described above is performed upon selection of a new head for the disk drive system so that read circuit parameters are then optimized for that selected new head.

Figure 3:
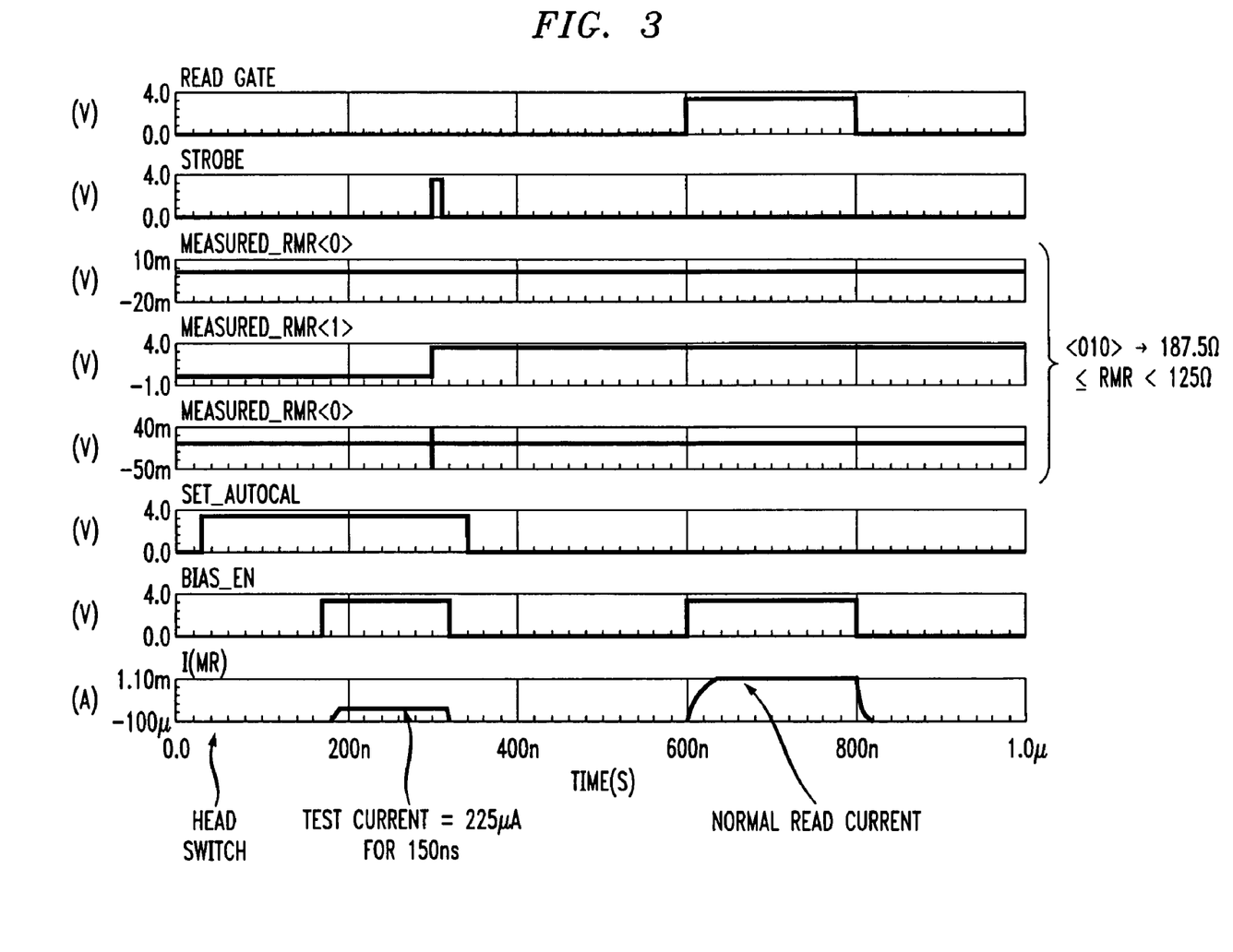
FIG. 3 illustrates timing diagrams of signals associated with the apparatus for determining read head resistance of FIG. 1.

FIG. 3 is a timing diagram illustrating waveforms for the signals described in FIG. 1 to determine the head resistance according to the teachings of the present invention. A head switch signal from the data processing device initiates the auto_cal sequence according to one embodiment of the present invention. The time at which the head switch signal is generated is indicated in FIG. 3. The auto_cal signal goes high to begin the auto_cal process and then the bias_en signal goes high. Responsive to the bias_en signal, the 225 µA test current is supplied to the head 102 for an interval of 150 ns. At the end of that period the bias_en signal and the auto_cal signals go low and the strobe signal goes high to strobe the contents of the transcoder 150 and the latches 155 (see FIG. 1) into the MR bias control block 104. A read gate period begins at approximately 600 ns when the bias circuits are again enabled and a normal read current (about 1 mA in one embodiment) is supplied to the read head 102. The three measured RMR signals in FIG. 3 represent the binary-encoded result of the RMR measurement process taken from the output of the transcoder 150 of FIG. 1.

Implementation of the present invention described above may not account for corruption of the measured Rmr value by a thermal asperity (TA) hit that coincides with the auto_cal (Rmr measurement) interval. Accordingly, another embodiment introduces averaging (or another technique for statistically combining several Rmr measurements) of the measured Rmr, at the expense of a longer autocal interval.

According to another embodiment of the invention having improved robustness to TA hits, the latches 155 supply (responsive to the strobe tag) a plurality of latched head resistance values to a logic circuit 165 illustrated in phantom in FIG. 1. The logic circuit 165 performs one or more arithmetic or statistical operations on the latched resistance values, such as averaging a plurality of head resistance values or eliminating outlier values that differ by more than a threshold value from other resistance values. The resultant resistance value is then supplied to the MR bias control block 104.

In one embodiment, the logic circuit 165 comprises an accumulator or register for receiving and summing four measured resistance values. After the values are summed together the two least significant bits of the sum are shifted out and discarded to effect a divide by four operation, i.e. an average of the four stored values. More or fewer head resistance values can be averaged according to similar techniques.

Figure 4:
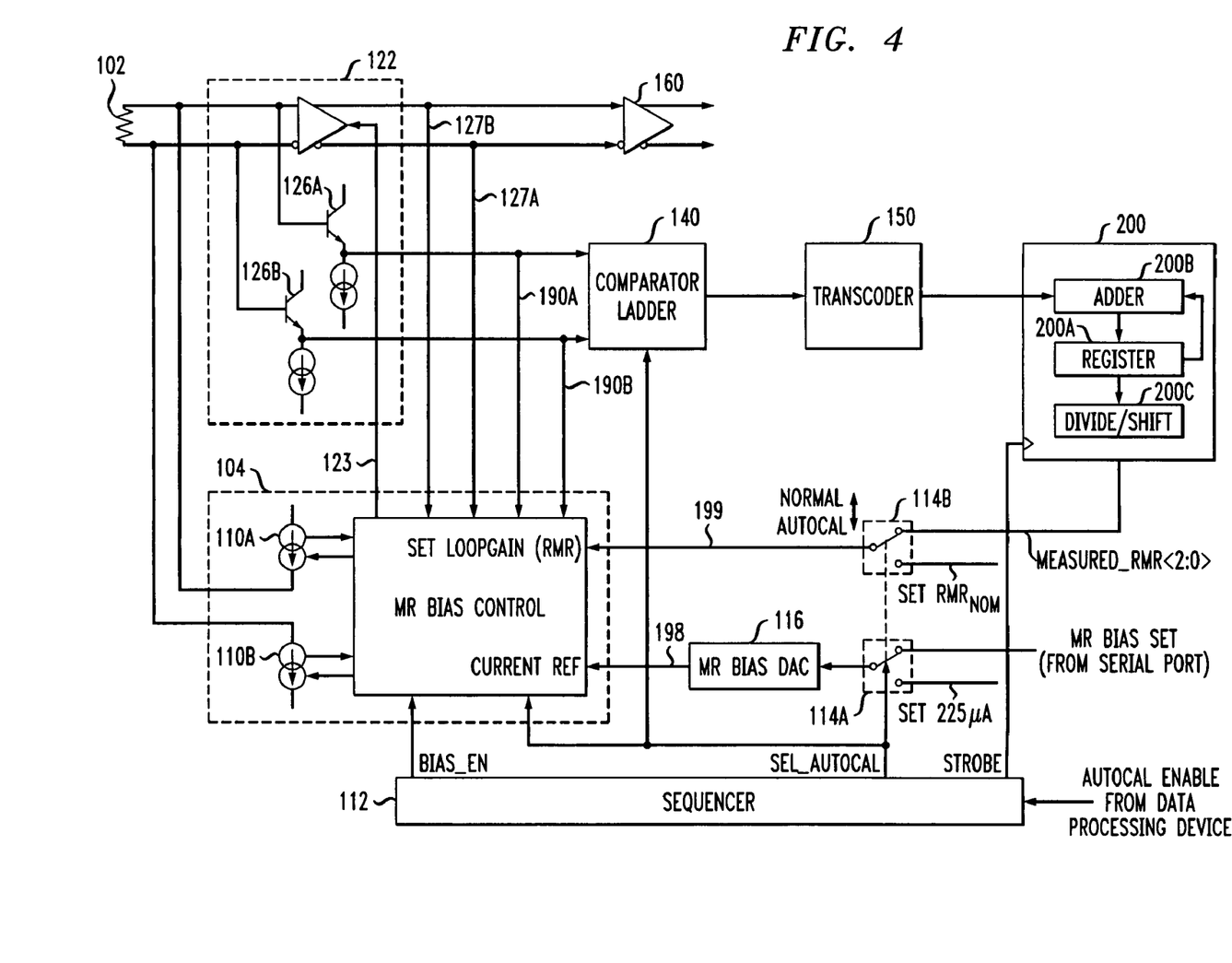
FIG. 4 is a partial schematic and partial block diagram of an apparatus for determining the read head resistance according to another embodiment of the present invention.

In this preferred embodiment illustrated in FIG. 4, the latches 155 of FIG. 1 are replaced by an accumulator 200 comprising a register 200A preceded by an adder 200B. The adder 200B sums present accumulator contents with the output of the transcoder 150. The 225 µA test current is maintained in the head for an interval sufficient to accumulate $2^N$ suitably time-spaced samples in the accumulator 200. Spacing is chosen as a compromise between measurement speed and probability of corruption of multiple samples. It is important to note that the 225 uA current is maintained constant —not switched —so that current settling time is not an issue. The accumulator output is then divided by $2^N$ (according to a hard-wired right-shift by N, for example) in a divide/shift element 200C and presented to the MR bias control block 104 as described above to establish loop gain control and ballast resistor selection. According to the embodiment of FIG. 4, it may thereby be possible more accurately to determine the head resistance by considering several head resistance measurements. The logic circuit 165 of FIG. 2 can also be employed with the FIG. 3 embodiment.

Another embodiment intended to improve robustness of the invention contemplates provision of a separate Rmr resistance-value register for each supported head. Upon initial power-up or responsive to an explicit command, all heads are scanned, an Rmr value acquired for each according to the teachings of the invention and the values latched into an associated register. The measured values are then used to set the loop gain parameters and ballast resistance values when a MR head is used to read data from its associated disk.

Alternatively, a storage register associated with an MR head is initialized upon first selection of the head following power up of the read circuits. Thereafter, whenever a specific head is selected, the Rmr measurement for that head is added to the accumulated head resistance as stored in the corresponding register, to determine a running average of the head resistance. The maintained running average is employed to set loop gain and ballast resistance values when that head is selected. Essentially, according to this embodiment the logic block 200 of FIG. 4 is modified to contain multiple registers 200A, one serving each head; a single adder 200B and a divide/shift element 200C is provided for shared use by all registers. A multiplexor (not shown in FIG. 3) selects the register to be updated or to have its contents delivered to the switch element 114A for input to the MR bias control block 104.

Yet another embodiment contemplates use of subranging, wherein the test current applied to the MR head in a measurement trial n+1 is contingent on the value of RMR measured in trial n. In this way stress to the MR head is minimized, as the assumption in trial n can be of a high-resistance head requiring low test current. Only if the measured RMR in trial n is determined to be low, is the test current raised for trial n+1. The subranging method can be applied with, or without, averaging.

Although the invention has been described in all variants as employing the normal current-bias circuitry in the reader to inject test current into the head, it is also possible to utilize a dedicated current source for this purpose.

Although described in the context of disc drive data storage systems, the teachings of the present invention also apply to other sensor types, including tape drive magnetoresistive head sensors. Further, although described in the context of a magnetoresistive head, the teachings of the present invention also apply to other resistive-type heads and sensors. The invention has been described for a test current supplied to the head; the principles of the invention are also applicable to the application of test voltage across the head.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A method for determining a sensor parameter of a resistive sensor, the method comprising:
    (a) supplying a bias test signal to the resistive sensor from a bias source controlled by a control loop during a parameter measurement interval, wherein, during an operating interval, the control loop controls the bias source to supply a bias operating signal to the resistive sensor;
    (b) permitting the control loop to reach a steady state condition;
    (c) measuring the sensor parameter responsive to the bias test signal;
    (d) digitizing the sensor parameter; and
    (e) storing a digitized representation of the sensor parameter, wherein steps (a)-(e) are performed (i) after completion of startup of a data processing device in which the resistive sensor is situated and (ii) in response to activation of the operating interval of the resistive sensor.

2. The method of claim 1, further comprising:
    (f) changing, during the operating interval, a characteristic of the control loop based on (i) the digitized representation of the sensor parameter and (ii) a value of the bias test signal such that the control loop presents a desired control loop gain.

3. The method of claim 2, wherein, in step (f), the control loop characteristic is transconductance of an operational transconductance amplifier.

4. The method of claim 2, wherein the desired gain is selected to optimize settling time of the bias control loop.

5. The method of claim 1, wherein the bias operating signal supplied to the resistive sensor during the operating interval is responsive to the sensor parameter.

6. The method of claim 1, wherein the resistive sensor is part of a read head of a disk drive data storage system, and the operating interval is a data read interval.

7. The method of claim 6, wherein step (a) is performed when the disk drive data storage system switches from a write operation to read operation.

8. The method of claim 6, wherein step (a) is performed when the disk drive data storage system is awakened from a power-conserving operating mode.

9. The method of claim 6, wherein steps (a)-(e) are performed every time a data read interval is activated.

10. The method of claim 1, wherein:
step (d) comprises (i) flash converting from an analog to a digital representation of the sensor parameter in the form of a thermometer code and (ii) converting the digital representation to a binary value representing the sensor parameter; and
step (e) comprises latching the binary value.

11. The method of claim 1 further comprising:
(f) repeating steps (a)-(e) to produce multiple sensor parameter values for the resistive sensor; and
(g) analyzing the multiple sensor parameter values to determine the sensor parameter for the resistive sensor.

12. The method of claim 11, wherein step (g) comprises averaging the multiple sensor parameter values.

13. The method of claim 1, wherein:
the bias source is a current bias source;
the bias test signal is a test current; and
the sensor parameter is a voltage across the resistive sensor that is proportional to the test current and a resistance of the resistive sensor.

14. The method of claim 1, wherein:
the bias source is a voltage bias source;
the bias test signal is a test voltage; and
the sensor parameter is a current through the resistive sensor that is proportional to the test voltage and a resistance of the resistive sensor.

15. The method of claim 1, further comprising performing N repetitions of steps (a)-(e) to produce N sensor parameter values, wherein the bias test signal for an (n+1)th repetition is responsive to the sensor parameter value supplied during the nth repetition.

16. A method for determining a sensor parameter for each resistive sensor of a plurality of resistive sensors, the method comprising:
(a) selecting a first of the plurality of resistive sensors to be an operative sensor, after completion of startup of a data processing device in which the operative sensor is situated and in response to activation of an operating interval of the first resistive sensor;
(b) supplying a bias test signal to the operative sensor from a bias source controlled by a control loop during a parameter measurement interval, wherein, during the operating interval of the operative sensor, the control loop controls the bias source supply a bias operating signal to the operative sensor;
(c) permitting the control loop to reach a steady state condition;
(d) measuring the sensor parameter of the operative sensor responsive to the bias test signal;
(e) digitizing the sensor parameter;
(f) storing a digitized representation of the sensor parameter;
(g) selecting a second of the plurality of resistive sensors as the operative sensor in response to activation of an operating interval of the second resistive sensor, different from the operating interval of the first resistive sensor, and repeating steps (b)-(f) for the second resistive sensor.

17. The method of claim 16, wherein:
the sensor parameter is a sensor resistance,
the test signal is a test current; and
step (c) further comprises measuring a voltage across the operative sensor and dividing the voltage by the test current to determine the sensor resistance.

18. The method of claim 16, wherein:
the sensor parameter is a sensor resistance
the test signal is a test voltage; and
step (c) further comprises measuring a current through the operative sensor and dividing the test voltage by the current to determine the sensor resistance.

19. The method of claim 16, wherein each resistive sensor is part of a read head of a disk drive data storage system and the operating interval is a data read interval.

20. The method of claim 16, wherein step (e) further comprises changing, during the operating interval, a characteristic of the control loop based on (i) the digitized representation of the sensor parameter and (ii) a value of the bias test signal such that the control loop presents a desired control loop gain.

21. The method of claim 16, repeating steps (b)-(e) for each sensor to generate a plurality of sensor parameters for each sensor and analyzing the plurality of sensor parameters to generate the sensor parameter.

22. An apparatus that determines a sensor parameter of a resistive sensor after completion of startup of the apparatus and in response to activation of an operating interval of the resistive sensor, the apparatus comprising:
a bias source that supplies (i) a bias operating signal to the resistive sensor during the operating interval and (ii) a bias test signal to the resistive sensor during a parameter measurement interval;
a control loop that controls the bias source during both the operating interval and the parameter measurement interval;
an encoder that detects and digitizes the sensor parameter responsive to the bias test signal; and
a memory element that stores, when the control loop reaches a steady state condition, a digitized representation of the sensor parameter.

23. The apparatus of claim 22, wherein:
the bias source is a current bias source;
the test signal is a test current; and
the sensor parameter is a voltage across the resistive sensor that is proportional to the test current and a resistance of the resistive sensor.

24. The apparatus of claim 22, wherein:
the bias source is a voltage bias source;
the test signal is a test voltage; and
the sensor parameter is a current through the resistive sensor that is proportional to the test voltage and a resistance of the resistive sensor.

25. The apparatus of claim 22, the apparatus further comprising:
an accumulator that adds successive digitized representations of the sensor parameter to generate a sum; and
a block that determines an average value of the sensor parameter based on the sum.

26. The apparatus of claim 22, operative with a data processing device, wherein the bias source supplies the test signal to the resistive sensor after the data processing device is awakened from a power-conserving operating mode.

27. The apparatus of claim 22, wherein the resistive sensor is part of a read head of a disk drive data storage system and the operating interval is a data read interval.

28. The apparatus of claim 27, wherein the bias source supplies the test signal to the read head when the disk drive data storage system switches from a write operation to a read operation.

29. The apparatus of claim 27, wherein the bias source supplies the bias test signal to the read head when the disk drive data storage system is awakened from a power-conserving operating mode.

30. The apparatus of claim 27, wherein the sensor parameter is determined every time a data read interval is activated.

31. The apparatus of claim 22, comprising a bias control module that changes, during the operating interval, a characteristic of the control loop based on (i) the digitized representation of sensor parameter and (ii) a value of the bias test signal such that the control loop presents a desired control loop gain.

32. The apparatus of claim 31, wherein the bias control module comprises one or more ballast resistors, and selects a resistance value of the one or more ballast resistors based on the sensor parameter.

33. The apparatus of claim 31, wherein the control loop characteristic is transconductance of an operational transconductance amplifier.

34. The apparatus of claim 31, wherein the desired gain is selected to optimize settling time of the bias control loop.

35. The apparatus of claim 22, wherein the memory element stores a plurality of sensor parameters determined during different parameter measurement intervals, and the apparatus further comprises a module for operating on the plurality of sensor parameters to determine the sensor parameter.

36. The apparatus of claim 22, wherein:
the encoder comprises (i) a comparator ladder that converts the sensor parameter to a thermometer code and (ii) a transcoder that converts the thermometer code to a binary value representing the sensor parameter; and
the memory element comprises one or more latches that store the binary value.

37. A method for determining a parameter of a resistive sensor, comprising:
supplying a bias test signal to the sensor from a bias source controlled by a control loop during a parameter measurement interval, wherein the control loop controls the bias source for supplying a bias operating signal to the sensor during an operating interval;
permitting the control loop to reach a steady state condition;
measuring a sensor parameter responsive to the bias test signal;
digitizing the sensor parameter; and
storing a digitized representation of the parameter, the method further comprising:
repeating the steps of supplying, permitting, measuring and digitizing to produce multiple sensor parameter values and analyzing the multiple sensor parameter values to determine the sensor parameter, wherein the step of analyzing comprises averaging the multiple sensor parameter values.

38. A method for determining a parameter of a resistive sensor, comprising:
supplying a bias test signal to the sensor from a bias source controlled by a control loop during a parameter measurement interval, wherein the control loop controls the bias source for supplying a bias operating signal to the sensor during an operating interval;
permitting the control loop to reach a steady state condition;
measuring a sensor parameter responsive to the bias test signal;
digitizing the sensor parameter; and
storing a digitized representation of the parameter, the method further comprising:
performing N repetitions of the steps of supplying, permitting, measuring and digitizing to produce N sensor parameter values, wherein the bias test signal for an (n+1)th repetition is responsive to the sensor parameter value supplied during the nth repetition.

39. An apparatus for determining a parameter of a resistive sensor, comprising:
a bias source for supplying a bias signal to the sensor during an operating interval and for supplying a test signal to the sensor during a parameter measurement interval;
a bias control module for controlling the bias source;
an encoder responsive to a sensor parameter responsive to the bias signal supplied to the sensor, for digitizing the sensor parameter; and
a memory element for storing a digitized representation of the sensor parameter, wherein the sensor parameter is supplied to the bias control module for controlling the bias sources during the operating interval, wherein the memory element comprises an accumulator for adding successive digitized representations to form a sum and determining an average value of the sensor parameter from the sum.

40. An apparatus for determining a parameter of a resistive sensor, comprising:
a bias source for supplying a bias signal to the sensor during an operating interval and for supplying a test signal to the sensor during a parameter measurement interval;
a bias control module for controlling the bias source;
an encoder responsive to a sensor parameter responsive to the bias signal supplied to the sensor, for digitizing the sensor parameter; and
a memory element for storing a digitized representation of the sensor parameter, wherein the bias control module comprises a ballast resistor, and wherein a value of the ballast resistor is responsive to the sensor parameter.

* * * * *